United States Patent
Horiuchi

(10) Patent No.: US 8,120,879 B2
(45) Date of Patent: Feb. 21, 2012

(54) HEAD SUSPENSION, LOAD BEAM, METHOD OF MANUFACTURING LOAD BEAM, AND METHOD OF PROCESSING WORK

(75) Inventor: Takashi Horiuchi, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 514 days.

(21) Appl. No.: 12/284,533

(22) Filed: Sep. 23, 2008

(65) Prior Publication Data

US 2009/0091859 A1    Apr. 9, 2009

(30) Foreign Application Priority Data

Oct. 3, 2007    (JP) .................. 2007-259572

(51) Int. Cl.
*G11B 21/21*    (2006.01)
(52) U.S. Cl. ............................................. 360/245.2
(58) Field of Classification Search .............. None
See application file for complete search history.

(56) References Cited

U.S. PATENT DOCUMENTS

| | | | |
|---|---|---|---|
| 5,636,089 A | 6/1997 | Jurgenson et al. | |
| 5,921,131 A * | 7/1999 | Stange | 72/379.2 |
| 6,154,952 A | 12/2000 | Tangren | |
| 6,246,546 B1 * | 6/2001 | Tangren | 360/245.1 |
| 6,378,195 B1 * | 4/2002 | Carlson | 29/603.03 |
| 6,556,384 B1 | 4/2003 | Inoue et al. | |
| 7,287,315 B2 * | 10/2007 | Hayami et al. | 29/729 |
| 2005/0091834 A1 * | 5/2005 | Hayami et al. | 29/603.03 |
| 2008/0024928 A1 * | 1/2008 | Yang | 360/245.1 |
| 2010/0139084 A1 * | 6/2010 | Mizuishi | 29/603.07 |

FOREIGN PATENT DOCUMENTS

| | | |
|---|---|---|
| JP | 6-330165 | 11/1994 |
| JP | 8-161843 | 6/1996 |
| JP | 10-199164 | 7/1998 |
| JP | 11-96709 | 4/1999 |
| JP | 2004-86984 | 3/2004 |
| JP | 2005-209291 | 8/2005 |
| JP | 2006-192536 | 7/2006 |
| WO | WO-00/63890 | 10/2000 |

* cited by examiner

*Primary Examiner* — Mark Blouin
(74) *Attorney, Agent, or Firm* — Jordan and Hamburg LLP

(57) ABSTRACT

A method of manufacturing a load beam directly improves the finishing accuracy of the surface of the load beam having a tab and/or a dimple, and the method includes a modifying process of preparing a flat plate work serving as the load beam and irradiating a part of a surface of the work where the tab and/or the dimple is formed with a laser beam, to form a modified layer in the irradiated part and a forming process of carrying out plastic working on the part where the modifies layer is present, to form the tab and/or the dimple in the part where the modified layer is present.

16 Claims, 8 Drawing Sheets

Before processing        Just after processing        Sectional view of product

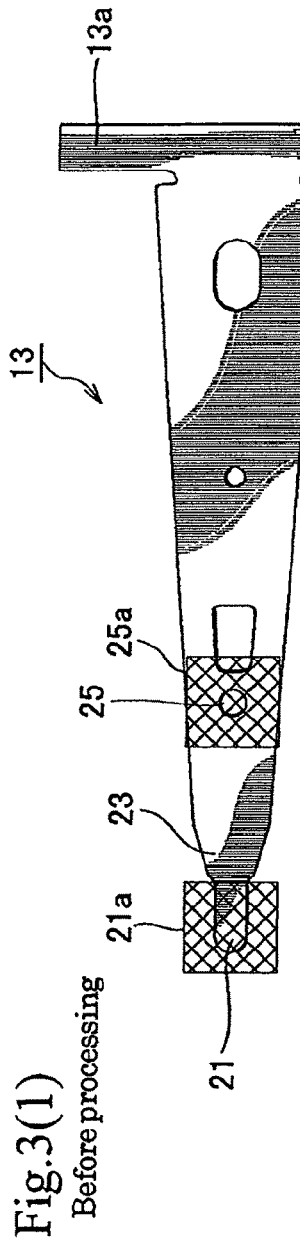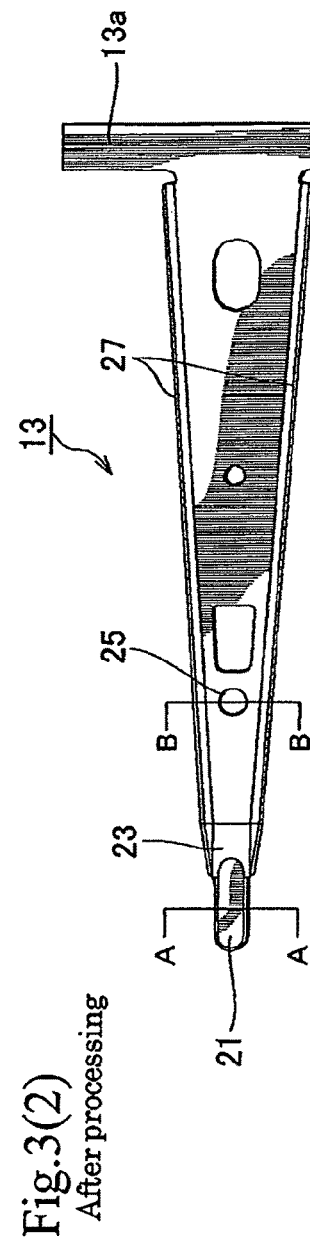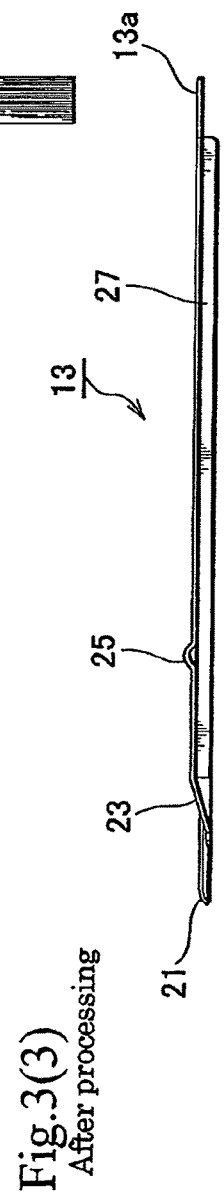
Fig.3(1) Before processing
Fig.3(2) After processing
Fig.3(3) After processing

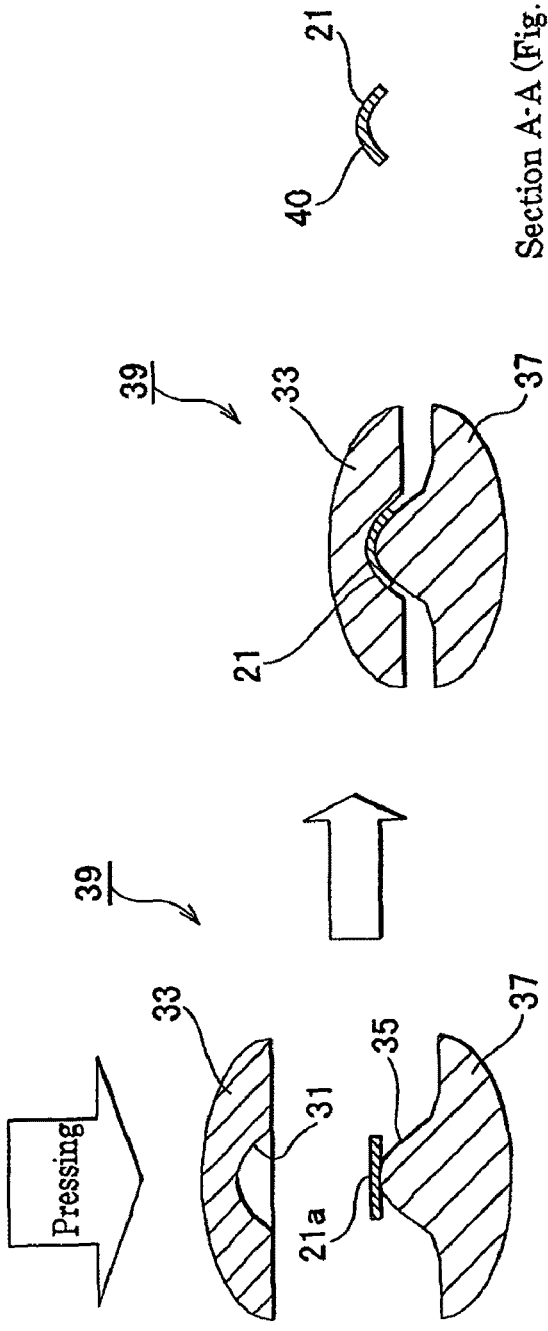

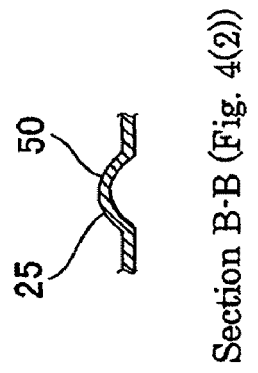
Fig.6(3) Sectional view of product
Section B-B (Fig. 4(2))
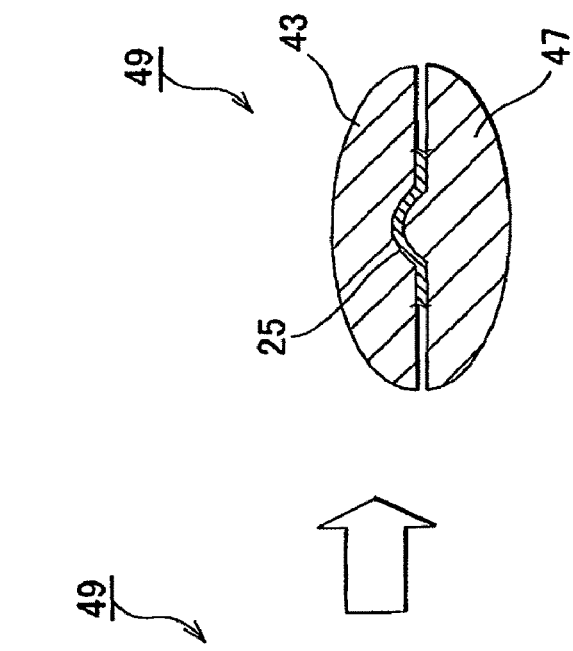
Fig.6(2) Just after processing
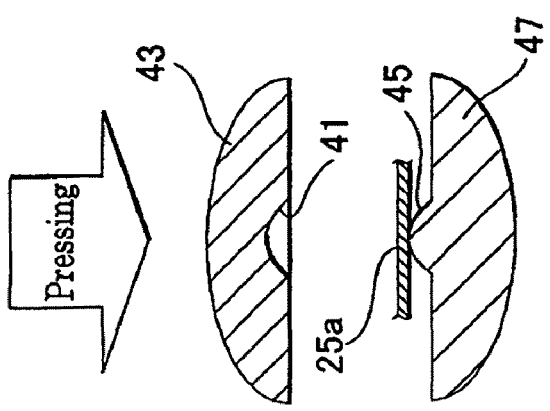
Fig.6(1) Before processing

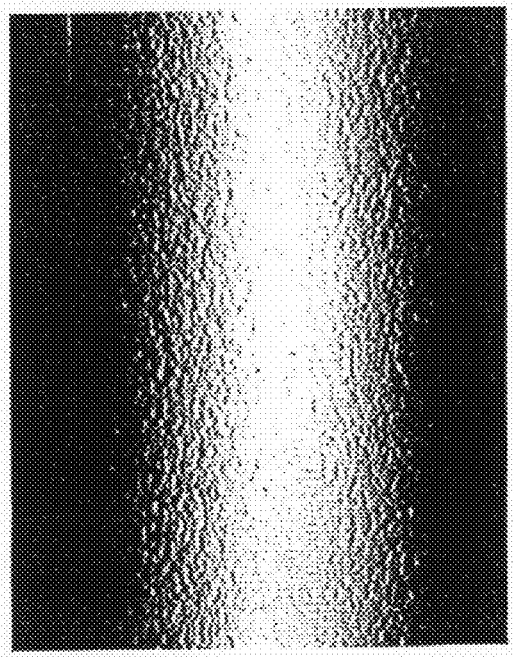
Fig.7(2) EMBODIMENT
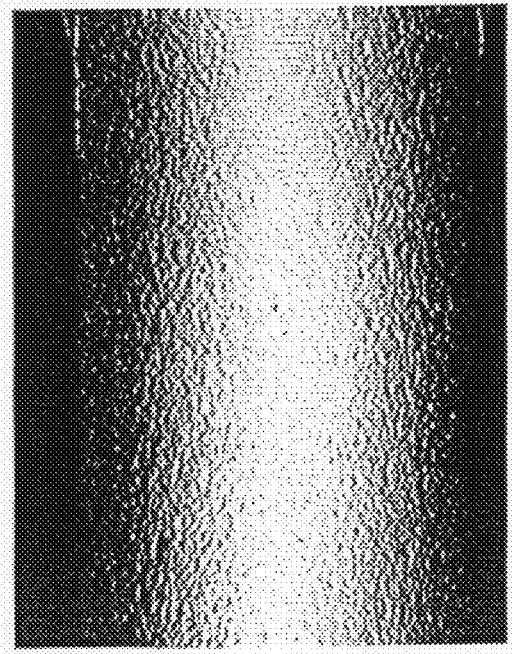
Fig.7(1) REFERENCE EXAMPLE

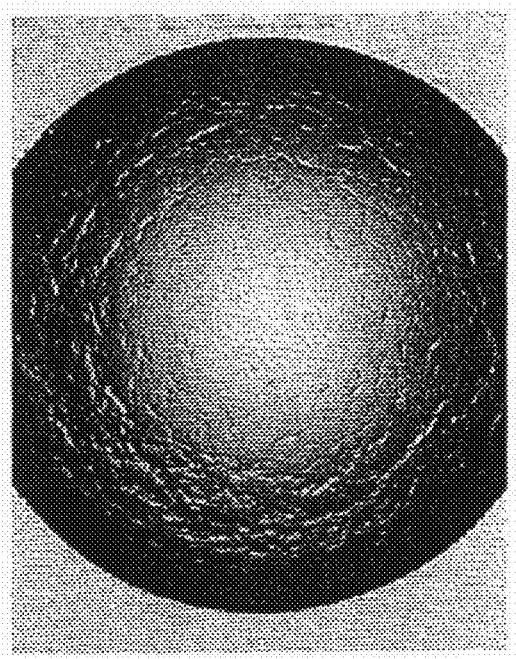
Fig.8(2) EMBODIMENT
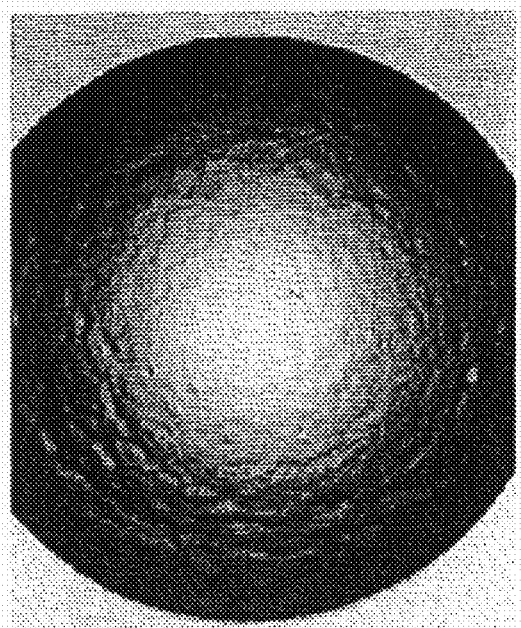
Fig.8(1) REFERENCE EXAMPLE

HEAD SUSPENSION, LOAD BEAM, METHOD OF MANUFACTURING LOAD BEAM, AND METHOD OF PROCESSING WORK

BACKGROUND OF THE INVENTION

1. Field of the Invention

The present invention relates to a head suspension for a disk drive serving as an external storage device of a computer, a load beam of the head suspension, a method of manufacturing the load beam, and a method of processing a work.

2. Description of Related Art

Disk drives such as magnetic disk drives and optical disk drivers are widely used as external storage devices for computers. The magnetic disk drive or a hard disk drive (HDD) employs a head suspension that supports a slider to write and read data to and from a magnetic disk incorporated in the magnetic disk drive.

The head suspension includes a base plate, a load beam, and a flexure attached to the load beam. The load beam is provided with a dimple to apply load onto the slider and movably support the same. The dimple has a spherical surface and is formed by pressing the load beam. When a disk in the hard disk drive is turned, the slider floats from the disk and sways with the dimple supporting the slider. This arrangement secures a smooth movement of the slider with respect to the disk.

There is a need to finish the spherical surface of the dimple as accurate as possible.

To meet the need, the applicant of the present invention has proposed in Japanese Unexamined Patent Application Publication No. 2006-192536 a technique of finishing a concave surface of a dimple die used to press a dimple. The technique employs a jet nozzle for jetting water to the concave surface of the dimple die and a particle feeder for feeding fine particles to hit the concave surface. The fine particles are jetted with the water jet to finish the concave surface into a mirror surface.

To entirely hit the concave surface with the water jet, the dimple die must be movably supported. The water jet is set in the range of 200 m/sec to 1000 m/sec in speed and the fine particles in the range of 6 nm to 100 nm in diameter, to suppress fluctuation in the coefficient of friction.

This related art finishes the surface of the dimple die into a mirror surface, so that a dimple formed with the dimple die may have a smooth surface. Namely, the related art tries to indirectly improve the surface finishing accuracy of a three-dimensional object (dimple).

SUMMARY OF THE INVENTION

An object of the present invention is to directly (not indirectly) improve the surface finishing accuracy of a three-dimensional object such as a dimple.

In order to accomplish the object, an aspect of the present invention provides a method of processing a work. The method includes preparing a flat plate as the work, irradiating the surface of a part of the work where a functional part is formed with a laser beam, to form a modified layer in the irradiated part, and carrying out plastic working on the modified part, to form the functional part.

This aspect reduces surface roughness of the functional part and make the surface of the functional part uniformly smooth. Namely, this aspect directly improves the surface finishing accuracy of the functional part.

According to another aspect of the present invention, the modified layer is formed by melting and softening the part of the surface of the work with a laser beam and the plastic working includes forging and pressing the melted and softened part.

This aspect surely reduces surface roughness of the functional part and make the surface of the functional part uniformly smooth.

According to still another aspect of the present invention, the functional part has a convex curved surface and serves as one of a dimple for supporting a slider so that the slider is movable in predetermined directions and a tab guided along a ramp block in a read/write device.

This aspect reduces surface roughness of the dimple and tab and make the surfaces of the dimple and tab uniformly smooth. The dimple and tab are functionally important parts of a load beam.

According to still another aspect of the present invention, there is provided a load beam. The load beam includes a flat plate body and a dimple and/or a tub as a functional part having a convex curved surface. A continuous surface covers the body of the load beam and the functional part. A modified layer is formed from the surface of the functional part on the continuous surface toward the inside thereof. The surface of the functional part is smooth and surface roughness thereof is lower than that of the body on the same continuous surface.

According to this aspect, the functional part formed on the load beam has reduced surface roughness.

BRIEF DESCRIPTION OF THE DRAWINGS

FIG. 3(1) is a front view showing a load beam (before processing) according to an embodiment of the present invention;

FIGS. 3(2) and 3(3) are front and side views showing the load beam (after processing) of FIG. 3(1);

FIGS. 5(1), 5(2), and 5(3) are views explaining a process of forming a tab with a metal mold;

FIGS. 6(1), 6(2), and 6(3) are views explaining a process of forming a dimple with a metal mold;

FIG. 7(1) is a laser micrograph showing the surface roughness of a tab processed according to a reference example;

FIG. 7(2) is a laser micrograph showing the surface roughness of a tab processed according to an embodiment of the present invention;

FIG. 8(1) is a laser micrograph showing the surface roughness of a dimple processed according to a reference example; and FIG. 8(2) is a laser micrograph showing the surface roughness of a dimple processed according to an embodiment of the present invention.

DETAILED DESCRIPTION OF EMBODIMENTS

A head suspension, a load beam, a method of manufacturing a load beam, a method of processing a work according to embodiments of the present invention will be explained in detail with reference to the drawings.

First, a method of processing a work according to an embodiment of the present invention will be explained. In the following explanation, the "work" implicates any material to be processed or any half-finished material to be processed into a product.

Figure 1:
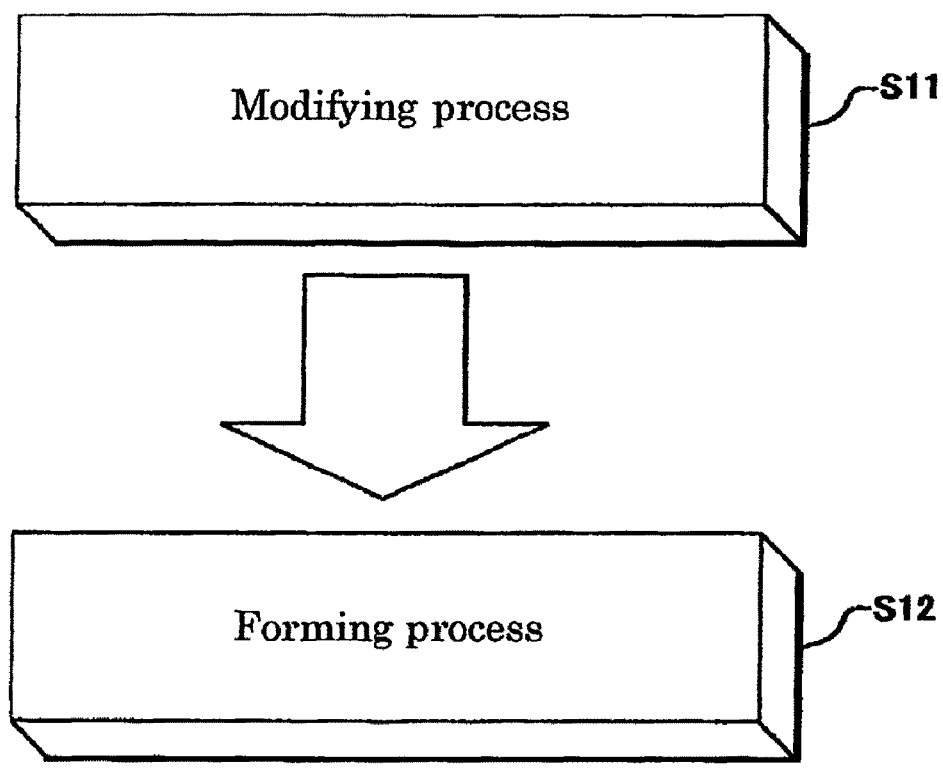
FIG. 1 is a view explaining a method of processing a work according to an embodiment of the present invention.

FIG. 1 is a view explaining the method of processing a work according to the embodiment.

In FIG. 1, the method includes a modifying process (step S11) and a forming process (step S12). These processes are sequentially carried out.

The modifying process of step S11 irradiates the surface of a work, which is a flat plate, with a laser beam, to modify the work at the part irradiated with the laser beam.

"Irradiating the surface of a work with a laser beam to modify the irradiated part" means to irradiate the surface of the work with a laser beam to quickly heat or solidify the irradiated part and thereby modify the irradiated part. Laser beam irradiating conditions are determined according to the material of the work and the like. Before achieving the method of the embodiment, laser beam irradiating conditions must be set properly according to the material of a work and the like. An emitter for emitting a laser beam may be selected from a semiconductor laser, a YAG laser, a carbon dioxide laser, or the like. After the completion of the modifying process, the forming process of step S12 is carried out.

The forming process of step S12 carries out plastic working to three-dimensionally process the work. Step S12 forms a protrusion or a dent at the irradiated part, i.e., the modified part of the work. The plastic working includes bending, cold forging, and cold pressing employing a metal mold.

In this way, the method according to this embodiment modifies a part of a work (a flat plate) by irradiating the surface of the part with a laser beam. Thereafter, the method carries out plastic working to three-dimensionally process the modified part.

The method of this embodiment can directly improve the surface finishing accuracy of a work.

The inventors of the present invention have found that a surface modifying technique using a laser is effective to directly improve the surface finishing accuracy of a work. The surface modifying technique using a laser irradiates a work with a laser beam when finishing the surface of the work.

Surface finishing accuracy realized by the surface modifying technique using a laser is dependent on processes adopted by the surface modifying technique.

Contrary to the idea of the present invention, there is an idea of carrying out plastic working to three-dimensionally process a work, and then, irradiating a part of the processed work with a laser beam to modify the irradiated part.

According to this idea, a work is first processed by bending, pressing, and the like, and thereafter, is irradiated with a laser beam. Since the work has three-dimensionally been processed at the time of laser irradiation, a distance from an emission point of the laser beam to an incident point of the laser beam on the surface of the work (hereinafter referred to as "laser beam distance") changes depending on the position of the incident point on the work.

Generally, a laser beam emitter involves a just focus mode and a defocus mode. Irrespective of these modes, the energy density of a laser beam is kept within a predetermined range if the laser beam distance is kept within a predetermined range, to substantially provide a uniform surface modifying effect. If the laser beam distance is out of the predetermined range, the energy density of a laser beam fluctuates to vary the surface modifying effect.

In this case, to uniformly modify a three-dimensional surface by laser beam irradiation, it is imperative to employ a control system for maintaining the laser beam distance within a predetermined range. Such a control system complicates the laser beam emission system and increases the cost thereof. Even if a laser beam is controlled to keep a predetermined laser beam distance, it is very difficult to uniformly modify the three-dimensional surface.

On the other hand, the method of the embodiment irradiates a work that is a flat plate with a laser beam, to modify a part of the surface of the work irradiated with the laser beam. Without the complicated distance control, the embodiment can entirely and uniformly modify the part of the surface of the work irradiated with the laser beam. Thereafter, the embodiment three-dimensionally processes the modified part of the work. Compared with the idea of three-dimensionally processing a work and then irradiating the work with a laser beam, the embodiment can improve the surface finishing accuracy of a work.

The method of the embodiment irradiates the surface of a flat plate work with a laser beam, to modify (melt) the irradiated part. Thereafter, the method three-dimensionally processes the modified part into a required shape by cold-forging and cold-pressing with the use of a metal mold.

The cold forging and pressing applied to the modified part of the work form a dense fine metal structure in the modified part and smooth the surface of the modified part. Namely, the embodiment provides the modified part with a uniformly smoothed precision surface.

Next, a method of manufacturing a load beam according to an embodiment of the present invention will be explained in detail with reference to the drawings. This method is based on the method of the preceding embodiment.

Before explaining the method, a head suspension incorporating a load beam will be explained.

Figure 2:
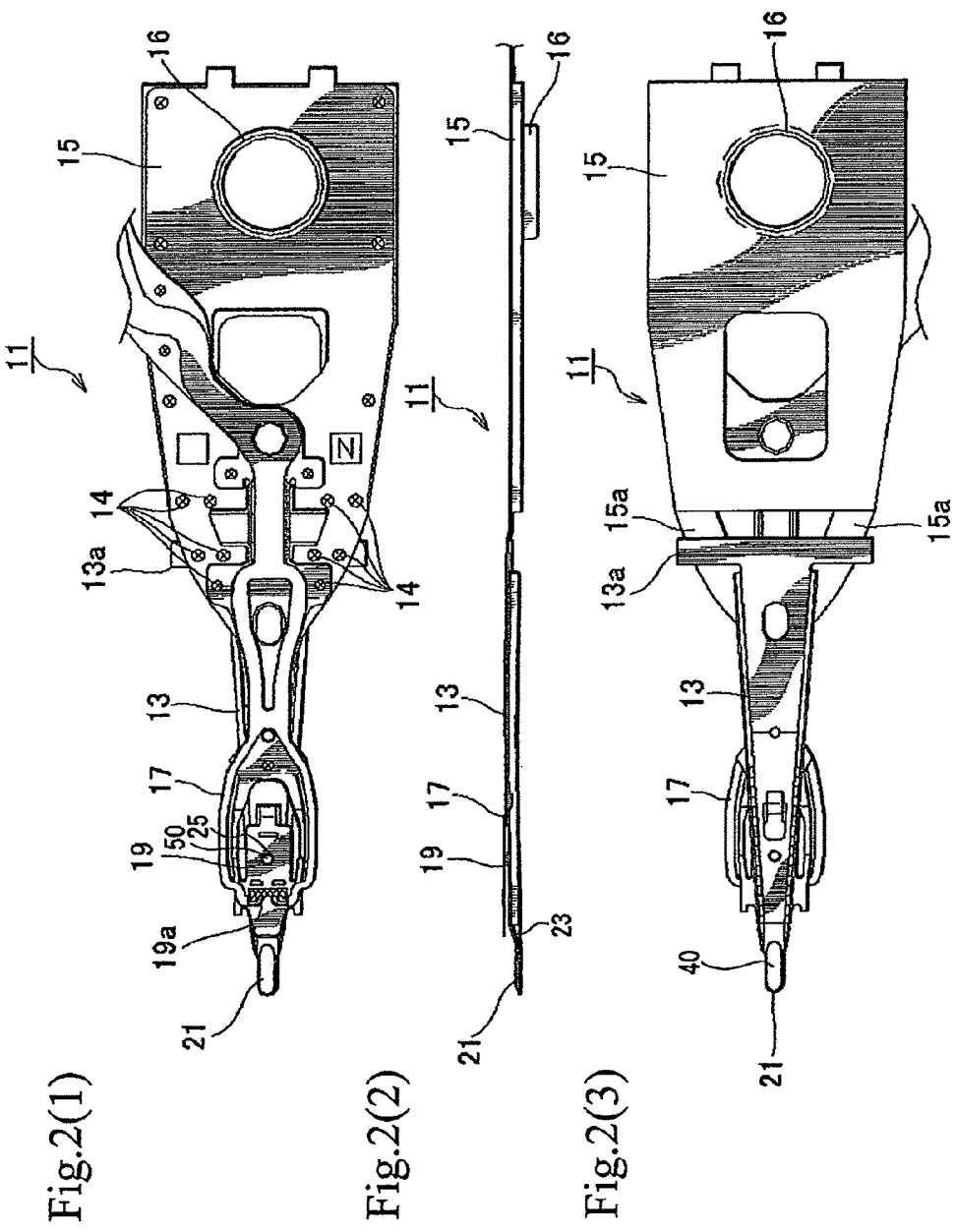
FIGS. 2(1), 2(2), and 2(3) are front, side, and back views showing a head suspension according to an embodiment of the present invention.

FIG. 2(1) is a front view showing a head suspension according to an embodiment of the present invention, FIG. 2(2) is a side view showing the same, and FIG. 2(3) is a back view showing the same.

The head suspension 11 includes a load beam 13, a base plate 15, a flexure 17, and other parts.

The load beam 13 is manufactured according to a method explained later. The load beam 13 is made of a precision thin plate spring and functions to apply load onto a slider. The load beam 13 may be made of a metal plate of austenite-based stainless steel such as SUS304 or SUS305 according to Japanese Industrial Standard. For example, the SUS304 contains 0.08% or lower C, 1% or lower Si, 2% or lower Mn, 0.04% or lower P, 0.03% or lower S, 8 to 10.5% Ni, 18 to 20% Cr, and the rest Fe. The thickness of the load beam 13 is in the range of several tens of micrometers to about 100 μm.

The load beam 13 has bent edges 27 (FIGS. 3(2) and 3(3)) extending in a longitudinal direction. The load beam 13 is a flat plate and has a dimple 25 and a tab 21 serving as functional parts.

The dimple 25 is formed at a location close to a front end of the load beam 13, to protrude from a surface of the load beam 13 so as to have an outer convex curved surface. The dimple 25 also has an inner concave curved surface opposite to the outer convex curved surface.

The tab 21 is formed at a front end of the load beam 13, to protrude like a tongue from the front end of the load beam 13 so as to have an outer convex curved surface. The tab 21 also has an inner concave curved surface opposite to the convex curved surface. Between the tab 21 and the front end of the load beam 13, there is a slope 23. The slope 23 is slanted by a predetermined angle such that the slope 23 is gradually away from the disk toward the front end of the slope 23. The slope 23 is reinforced with the bent edges 27 extending from the load beam 13. The base of the tab 21 is supported and reinforced with the slope 23.

The surfaces of the dimple 25 and tab 21 are smoothly continuous to the surface of the body of the load beam 13. Namely, the surfaces of the dimple 25, tab 21 and load beam 13 is formed on a single continuous surface covering them. From the surface to the inside of each of the dimple 25 and tab 21, there is formed a modified layer. At the surface of the dimple 25 (tab 21), the modified layer has a smoothly processed uniform surface 50 (40) whose surface roughness is lower than that of the body of the load beam 13 on the same continuous surface.

The flexure 17 is made of a conductive thin metal plate such as a resilient thin stainless steel rolled plate and has a thickness of about 20 μm. The flexure 17 is fixed to the load beam 13 by, for example, laser welding. The flexure 17 has an insulating layer on which a wiring pattern (not shown) is formed.

The flexure 17 has a slider mount 19. The slider mount 19 has a read/write terminal 19a. The terminal 19a is electrically connected to one end of the wiring pattern of the flexure 17. The other end of the wiring pattern of the flexure 17 is extended toward the base plate 15.

The slider mount 19 supports a slider (not shown) that incorporates a transducer (not shown). The slider is arranged to face a track of a disk (not shown). The slider is supported on the dimple 25 so that the slider may roll and pitch.

When the disk is turned at high speed, the slider slightly floats from the disk to form an air bearing between the disk and the slider, as is known in the art.

A base 13a of the load beam 13 is fixed to the base plate 15 by, for example, laser welding at welding spots 14. The base plate 15 has a pair of springs 15a each made of a resilient thin stainless steel rolled plate. The springs 15a support the load beam 13.

The base plate 15 has a boss 16, which is attached to a carriage arm (not shown) to turn the base plate 15 around an axis. The base plate 15 may be integral with an arm that is attached to a carriage.

When the base plate 15 is turned, the head suspension 11 moves in a transverse direction of the disk to position the slider onto a target track on the disk. When loading/unloading the head suspension 11, the tab 21 is guided along a guide or a ramp block (not shown) in a hard disk drive in which the head suspension 11 is installed. The ramp block has a ramp guide surface and is generally arranged in the vicinity of the periphery of the disk. For example, when the disk is stopped, the tab 21 is moved onto the ramp block along which the tab 21 slides to retract through the ramp guide surface. With the ramp block, the slider of the head suspension 11 can move into a retract zone at the side of the disk and be away from the disk. The ramp block is made of synthetic resin.

Next, method of manufacturing a load beam of the head suspension according to an embodiment of the present invention will be explained.

Figure 4:
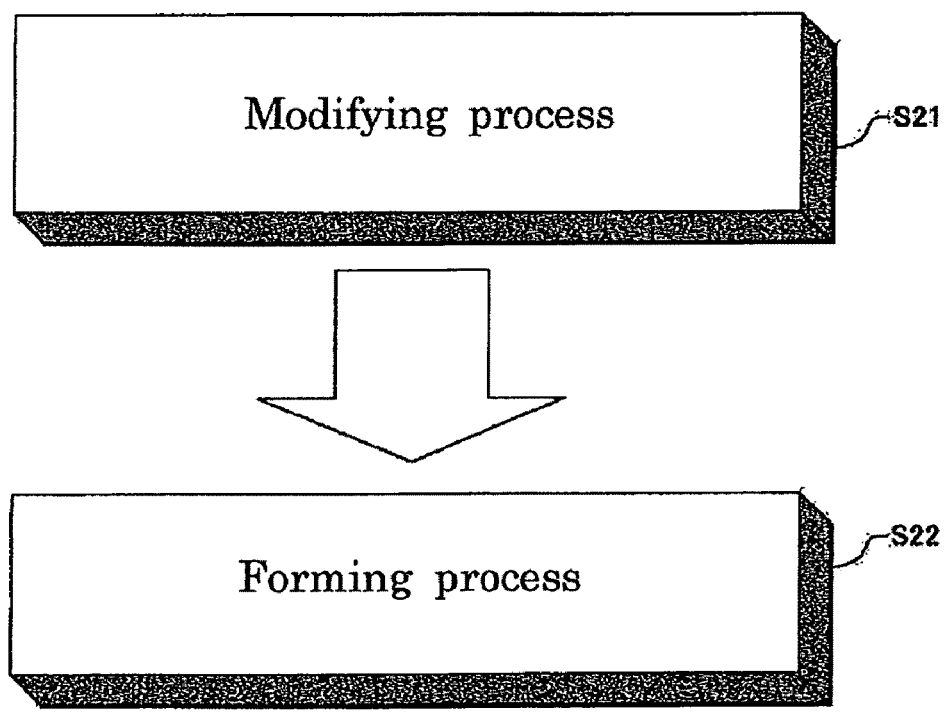
FIG. 4 is a view explaining a method of manufacturing a load beam according to an embodiment of the present invention.

FIG. 3(1) is a front view showing the load beam before processing, FIG. 3(2) is a front view showing the load beam after processing, and FIG. 3(3) is a side view showing the load beam after processing. FIG. 4 is a view explaining a method of manufacturing a load beam according to an embodiment of the present invention. FIGS. 5(1), 5(2), and 5(3) are views explaining a process of forming a tab with a metal mold. FIGS. 6(1), 6(2), and 6(3) are views explaining a process of forming a dimple with a metal mold.

In FIGS. 3(1) to 3(3) and 4, the load beam manufacturing method includes a modifying process of step S21 and a forming process of step S22. The steps S21 and S22 are sequentially carried out.

The modifying process of step S21 irradiates a work which is a flat plate with a laser beam to form a modified part where a functional part is formed.

At first, a work which is a flat plate processed into the load beam 13 is prepared. In practice, a flat plate containing a plurality of shaped parts that are chained and are processed into load beams by, for example, etching is prepared as a work so that the chained parts are processed into a plurality of load beams in later stages. Naturally, a flat plate containing a shaped single load beam material may be prepared as a work. It is possible to prepare as a work a flat plate containing an unshaped load beam material. The flat plate work is a metal sheet such as a stainless steel rolled sheet.

In FIG. 3(1), a hatched part 21a on the work (load beam 13) includes a part where the tab 21 is going to be formed and the periphery thereof, and a hatched part 25a includes a part where the dimple 25 is going to be formed and the periphery thereof. The parts 21a and 25a are irradiated with a laser beam in the modifying process of step S21. In the modifying process, the parts 21a and 25a are rapidly heated or solidified, to form a modified layer at the surface of each of the parts 21a and 25a. The modifying process produces a semifinished load beam having the modified layers. After the modifying process, the forming process of step S22 is carried out.

The part 21a (25a) irradiated with a laser beam spreads around a spot where the tab 21 (dimple 25) is formed as mentioned above. This is to secure that the modified layer surely covers the spot where the tab 21 (dimple 25) is formed.

The forming process of step S22 carries out plastic working to three-dimensionally process the modified parts into the tab 21 and dimple 25 serving as functional parts. The plastic working is, for example, cold forging or cold pressing employing a metal mold. At the completion of step S22, there is provided a load beam product having the tab 21 and dimple 25. In addition to the tab 21 and dimple 25, the slope 23, bent edges 27, and the like are pressed.

FIGS. 5(1) to 5(3) show the details of forming the tab 21. To form the tab 21, a metal mold 39 is used. The metal mold 39 has a punch 33 and a stationary die 37. The punch 33 has a recess 31 that is smooth and has a half cylinder shape. The die 37 has a protrusion 35 that is smooth and has a half cylinder shape.

In FIG. 5(1), the semifinished load beam having the modified layers is set at a predetermined position in the metal mold 39. The semifinished load beam in this case includes a flat plate prepared as a work that is a metal sheet such as a stainless steel rolled sheet. In addition, the semifinished load beam also includes a flat plate prepared as a work having a plurality of shaped parts that are chained or a single shaped part processed into load beams by, for example, etching. Each semifinished load beam is reformed or modified by irradiating a laser beam on the surface of the part 21a.

In FIG. 5(2), the punch 33 is descended onto the semifinished load beam set on the die 37 and is pressed to the semifinished load beam at a predetermined pressure. The load beam is pressed in a thickness direction, to form the tab 21 (FIG. 5(3)) having an elongated curved shape.

At this time, the tab 21 is provided with a smoothly processed surface 40 as an outer convex curved surface having dense fine metal structure and smoothness. The surface 40 of the tab 21 has a proper surface roughness and is uniformly smooth. The surface 40 is the surface that contacts the ramp block and is functionally important to smoothly load/unload the head suspension with respect to the ramp block.

FIGS. 6(1) to 6(3) show the details of forming the dimple 25. To form the dimple 25, a metal mold 49 is used. The metal mold 49 has a punch 43 and a stationary die 47. The punch 43 has a recess 41 that is smooth and has a hemispherical shape. The die 47 has a protrusion 45 that is smooth and has a hemispherical shape.

In FIG. 6(1), the semifinished load beam having the modified layers is set at a predetermined position in the metal mold 49. The semifinished load beam in this case includes a flat plate prepared as a work that is a metal sheet such as a stainless steel rolled sheet. In addition, the semifinished load beam also includes a flat plate prepared as a work having a plurality of shaped parts that are chained or a single shaped part processed into load beams by, for example, etching. Each semifinished load beam is reformed or modified by irradiating a laser beam on the surface of the part 25a.

In FIG. 6(2), the punch 43 is descended onto the semifinished load beam set on the die 47 and is pressed to the semifinished load beam at a predetermined pressure. The load beam is pressed in a thickness direction, to form the dimple 25 (FIG. 6(3)) having a semicircular shape.

At this time, the dimple 25 is provided with a smoothly processed surface 50 as an outer convex curved surface having a hemispherical shape, dense fine metal structure and smoothness. The surface 50 of the dimple 25 has a proper surface roughness and is uniformly smooth. The surface 50 is a spherical surface that contacts the slider and is functionally important to properly control the attitude of the slider.

In this way, the load beam manufacturing method of the embodiment irradiates the surface of a flat plate work with a laser beam, to modify the irradiated part and carries out plastic working to three-dimensionally process the modified part into a functional part (tab, dimple, or the like).

Consequently, the load beam manufacturing method of the embodiment can accurately directly improve the surface finishing accuracy of the functional part.

Next, surface roughness of the surface 40 (50) of the tab 21 (dimple 25) formed according to the embodiment will be explained.

Table 1 shows measurements of the surface roughness of tabs and dimples formed according to the embodiment, a comparative example, and a reference example. The tab and dimple according to the embodiment are formed by irradiating the surface of a work with a laser beam of fixed focus to modify the irradiated surface and by three-dimensionally processing the work. The tab and dimple according to the comparative example are formed by three-dimensionally processing the work without the laser-beam modifying process. The tab and dimple according to the reference example are formed by three-dimensionally processing a work to form the tab and dimple, and then, by irradiating the work with a laser beam of fixed focus (without laser-beam-distance control) to modify the surfaces of the tab and dimple.

In Table 1, a column "Center" shows surface roughness data obtained with the tab 21 being in an upright state, a column "Right" shows surface roughness data obtained with the tab 21 inclined by about 15 degrees to the right, and a column "Left" shows surface roughness data obtained with the tab 21 inclined by about 15 degrees to the left.

FIG. 7(1) is a laser micrograph (magnification of 20) showing the tab 21 according to the reference example and FIG. 7(2) is a laser micrograph (magnification of 20) showing the tab 21 according to the embodiment. FIG. 8(1) is a laser micrograph (magnification of 50) showing the dimple 25 according to the reference example and FIG. 8(2) is a laser micrograph (magnification of 50) showing the dimple 25 according to the embodiment.

TABLE 1

Surface roughness comparison table (unit: μm)

|  | Tab | | | Dimple |
| --- | --- | --- | --- | --- |
|  | Right | Center | Left |  |
| Comparative example | — | 0.119 | — | 0.020 |
| Reference example | 0.083 | 0.071 | 0.075 | 0.050 |
| Embodiment | 0.051 | 0.052 | 0.050 | 0.016 |

In Table 1, the surface roughness of the comparative example is 0.119 μm at "Center" of the tab 21 and 0.020 μm on the dimple 25. The surface roughness of the reference example is 0.083 μm at "Right" of the tab 21, 0.071 μm at "Center" of the tab 21, 0.075 μm at "Left" of the tab 21, and 0.050 μm on the dimple 25. On the other hand, the surface roughness of the embodiment is 0.051 μm at "Right" of the tab 21, 0.052 μm at "Center" of the tab 21, 0.050 μm at "Left" of the tab 21, and 0.016 μm on the dimple 25.

Comparing the surface roughness data of the tabs 21 between the reference example and the embodiment, it is understood that the surface roughness of the reference example fluctuates among "Right," "Center," and "Left" from 0.071 μm to 0.083 μm. On the other hand, the embodiment is stable within the range of 0.050 μm to 0.052 μm. Comparing the surface roughness data of the tabs 21 among the comparative example, reference example, and embodiment, it is understood that the embodiment shows a lowest value of 0.052 μm at "Center". Comparing the surface roughness data of the dimples 25 among the comparative example, reference example, and embodiment, it is understood that the embodiment shows a lowest value of 0.016 μm.

The smoothly processed surface 40 of the tab 21 according to the embodiment has proper and uniform surface roughness, as is apparent from comparison between the micrograph of FIG. 7(1) of the reference example and the micrograph of FIG. 7(2) of the embodiment.

The smoothly processed surface 50 of the dimple 25 according to the embodiment has proper and uniform surface roughness, as is apparent from comparison between the micrograph of FIG. 8(1) of the reference example and the micrograph of FIG. 8(2) of the embodiment.

The tab 21 having the smoothly processed surface 40 according to the embodiment never damages the ramp block when the tab 21 slides along the ramp block. Accordingly, the head suspension employing the load beam of the embodiment is smoothly loaded/unloaded with respect to the ramp block. The dimple 25 having the smoothly processed surface 50 according to the embodiment smoothly contacts the slider to properly control the attitude of the slider.

As explained above, the load beam manufacturing method according to the embodiment includes the modifying process that irradiates a flat plate work with a laser beam to modify at least parts of the surface of the work where the tab 21 and dimple 25 are formed and the forming process that carries out plastic working to process the modified parts into the tab 21 and dimple 25.

The tab 21 and dimple 25 are functionally important parts of the load beam 13. With the use of the surface modifying technique employing a laser beam, the embodiment reduces the surface roughness of the tab 21 and dimple 25 and makes the surface roughness uniform. In this way, the embodiment can accurately directly improve the surface finishing accuracy of the tab 21 and dimple 25.

According to the reference example that three-dimensionally processes a work to form a tab and a dimple on the work, and thereafter, irradiates the tab and dimple with a laser beam, to modify the tab and dimple. In this case, the laser beam distance varies depending on a laser beam incident position on the tab or dimple.

Generally, a laser beam emitter involves a just focus mode and a defocus mode. Irrespective of these modes, the energy density of a laser beam is kept within a predetermined range if the laser beam distance is kept within a predetermined range, to substantially provide a uniform surface modifying effect. If the laser beam distance is out of the predetermined range, the energy density of a laser beam fluctuates to vary the surface modifying effect.

In this case, to uniformly modify a three-dimensional surface by laser beam irradiation, it is imperative to employ a control system for maintaining the laser beam distance within a predetermined range. Such a control system complicates the laser beam emission system and increases the cost thereof. Even if a laser beam is controlled to keep a predetermined laser beam distance, it is very difficult to uniformly modify the three-dimensional surface.

On the other hand, the load beam manufacturing method of the embodiment irradiates a work that is a flat plate with a laser beam to modify parts of the work that become the tab 21 and dimple 25 of the load beam 13. Without the complicated distance control, the embodiment can uniformly modify parts of the work irradiated with a laser beam. After modifying the work with a laser beam, the embodiment three-dimensionally presses the modified parts of the work into the tab 21 and dimple 25. Compared with the technique of pressing a work into a tab and dimple and then irradiating the surfaces of the tab and dimple with a laser beam to modify them, the embodiment can accurately directly improve the surface finishing accuracy of the work (load beam).

The load beam manufacturing method of the embodiment irradiates the surface of a flat plate work with a laser beam at parts to be formed into a tab and a dimple, to modify (melt) the irradiated parts of the work surface. Thereafter, the method forges and presses the modified parts of the work into the tab and dimple.

When the modified parts that have been melted and softened are forged and pressed, metal structure of the parts become very dense, fine and smooth. As a result, the surfaces of the tab 21 and dimple 25 decrease and become uniformly smooth.

To elongate the service life of a press metal mold, a pressure applied to the press metal mold must be low. On the other hand, to uniformly smooth the surface of a work by pressing, a pressure applied to the press metal mold must be high. Namely, elongating the service life of a press metal mold and uniformly smoothing the surface of a work with the press metal mold are tradeoffs.

For this, the load beam manufacturing method of the embodiment presses the modified parts that have been melted and softened with a laser beam. Compared with the reference example that processes an unmodified work in advance, the embodiment can employ a lower pressure for pressing the work, to uniformly smooth the surfaces of the modified parts of the work. Namely, the embodiment can uniformly smooth the surface of a work, and at the same time, can elongate the service life of a press metal mold.

According to the reference example that three-dimensionally presses a work to form a tab and a dimple, and thereafter, irradiates the work with a laser beam, heat of the laser beam will easily deform the tab or dimple. If such deformation exceeds an acceptable level, a correcting process is needed to correct the deformation.

According to the load beam manufacturing method of the embodiment, the pressing work in the second step (S22) can correct such deformation even if the deformation occurs on the tab 21 or dimple due to heat of a laser beam in the first step (S21). Namely, the embodiment needs no additional correcting process for correcting such deformation.

The load beam 13 produced according to the manufacturing method of the embodiment has a flat body and functional parts, i.e., the tab 21 and dimple 25 each having a convex curved shape. A continuous surface covers the body and the functional parts. Along the surface of each functional part on the continuous surface, the modified layer extends to the inside of the functional part. The surface roughness of each modified layer is lower than that of the load beam body on the same continuous surface and the surface of the modified layer is uniformly smooth. With this configuration, the load beam 13 can smoothly be loaded and unloaded with respect to the ramp block and properly control the attitude of the slider supported by the load beam 13.

The head suspension 11 provided with the load beam 13 of the embodiment can smoothly be loaded and unloaded with respect to the ramp block and properly control the attitude of the slider.

The present invention is not limited to the embodiments mentioned above. Without departing from the scope and spirit of the present invention stipulated in the specification and appended claims, the present invention allows a variety of modifications. Accordingly, it should be understood that the present invention covers head suspensions, load beams, load beam manufacturing methods, and work processing methods that occur from such modifications.

For example, the load beam manufacturing method of the present invention may produce only one of the functional parts, i.e., one of the tab 21 and dimple 25.

What is claimed is:

1. A load beam having a flat plate body supported in a read/write device so as to turn in the read/write device and apply load onto a slider that writes and reads data to and from a medium in the read/write device, the load beam comprising:
   a functional part formed on the body of the load beam and having a convex curved surface;
   a continuous surface covering the body of the load beam and the functional part; and
   a modified layer extending from the surface of the functional part covering a top of the convex curved surface on the continuous surface to the inside thereof, the modified layer being modified in two steps by irradiating a part of the load beam to be shaped into the functional part with a laser beam and thereafter carrying out a plastically deforming pressing on the irradiated part, said irradiating and pressing causing the surface of the functional part to be uniformly smooth and have lower surface roughness than the body of the load beam on the continuous surface.

2. The load beam of claim 1, wherein:
   the functional part is one of a dimple and a tab, the dimple being configured to support the slider so that the slider is movable in predetermined directions, the tab being configured to slide along a guide in the read/write device when the slider is retracted.

3. A method of manufacturing a load beam having a functional part, comprising:
   preparing a flat plate work and irradiating a part of a surface of the work where the functional part is formed with a laser beam, thereby forming a modified layer in the irradiated part; and carrying out a plastically deforming pressing process on the part where the modified layer is present, after said irradiating, thereby forming the functional part in the part where the modified layer is present and finishing the modified layer that is modified by said irradiating and pressing and covers a top of the convex curved surface of the functional part.

4. The method of claim 3, wherein:
the modified layer is formed by melting and softening the part of the surface of the work with a laser beam; and
the plastic working includes forging and pressing the melted and softened part.

5. The method of claim 3, wherein:
the functional part has a convex surface and is one of a dimple and a tab, the dimple being configured to support a slider so that the slider is movable in predetermined directions, the tab being configured to slide along a guide in a read/write device when the slider is retracted.

6. The method of claim 4, wherein:
the functional part has a convex surface and is one of a dimple and a tab, the dimple being configured to support a slider so that the slider is movable in predetermined directions, the tab being configured to slide along a guide in a read/write device when the slider is retracted.

7. A load beam manufactured according to the method of claim 3.

8. A load beam manufactured according to the method of claim 4.

9. A load beam manufactured according to the method of claim 5.

10. A load beam manufactured according to the method of claim 6.

11. A head suspension comprising the load beam of claim 7.

12. A head suspension comprising the load beam of claim 8.

13. A head suspension comprising the load beam of claim 9.

14. A head suspension comprising the load beam of claim 10.

15. A method of processing a work to provide a three-dimensionally processed part having a convex curved surface, comprising:
preparing a flat plate as the work and irradiating a part of a surface of the work with a laser beam, thereby forming a modified layer in the irradiated part; and
carrying out a plastically deforming pressing process on the part where the modified layer is present, after said irradiating, thereby forming a required shape in the part where the modified layer is present and finishing the modified layer that is modified by said irradiating and pressing and covers a top of the convex curved surface of the three-dimensionally processed part.

16. A method of manufacturing a load beam for a read/write device, the load beam having a flat plate body for being supported in the read/write device so as to turn and apply load onto a slider that writes and reads data to and from a medium in the read/write device, the method comprising:
preparing a flat plate body having a continuous surface; and
irradiating the flat plate body with a laser to modify surface properties of a surface layer of the flat plate body, said irradiating including irradiating a first portion of the flat plate body where a functional part is to be formed to soften said first portion; and
after said irradiating, plastically deforming said first portion by pressing to form the functional part to thereby have a convex curved shape at one surface of said first portion and a concave curved shape at an opposite surface of said first portion;
said irradiating and pressing smoothing said one surface so that the convex curved shaped surface of the functional part is uniformly smooth and has lower surface roughness than a remaining portion of said continuous surface.

* * * * *